United States Patent [19]
Brody et al.

[11] Patent Number: 5,481,647
[45] Date of Patent: Jan. 2, 1996

[54] USER ADAPTABLE EXPERT SYSTEM

[75] Inventors: Bill E. Brody, Dallas; Steven B. Cudd, Richardson; Ronald M. Rose, Carrollton, all of Tex.

[73] Assignee: Raff Enterprises, Inc., Dallas, Tex.

[21] Appl. No.: 125,034

[22] Filed: Sep. 21, 1993

Related U.S. Application Data

[63] Continuation of Ser. No. 673,955, Mar. 22, 1991, abandoned.

[51] Int. Cl.$^6$ .................................................. G06F 15/18
[52] U.S. Cl. ................................ 395/51; 395/76; 395/925
[58] Field of Search .............................. 395/50, 51, 925, 395/51, 76

[56] References Cited

U.S. PATENT DOCUMENTS

| | | | |
|---|---|---|---|
| 4,803,641 | 2/1989 | Hardy et al. | 395/76 |
| 4,914,590 | 4/1990 | Loatman et al. | 364/200 |
| 4,939,668 | 7/1990 | Brown et al. | 364/513 |
| 4,970,658 | 11/1990 | Durbin et al. | 395/76 |
| 4,972,328 | 11/1990 | Wu et al. | 395/76 |
| 5,009,833 | 4/1991 | Takeuchi et al. | 395/76 |
| 5,136,523 | 8/1992 | Landers | 395/54 |

FOREIGN PATENT DOCUMENTS

| | | | |
|---|---|---|---|
| 0355716 | 2/1990 | European Pat. Off. | 395/900 |

OTHER PUBLICATIONS

A Framework for Knowledge Based Systems in Nial; 6th Annual Inter. Phoenix Conf. on Computers and Communications; 1987; Chan et al; pp. 286–291.

Weiss, J. "Turning on art into a science: expert Tax programs," MacWEEK, Jul. 31, 1989, p. 24(2).

Keyes, J., "AI in the BIG SIX," AI Expert, May 1990, 37–42.

Liang et al., "A Knowledge Base Controlled Signal Processing and Scoring System for the Exercise ECG", Proc.: Computers in Cardiology, Sep. 1988, 223–226.

Thomson, E., "Statistical system does the thinking for users," Digital Review, v. 6 No. 5, Feb. 1989, p. 31 (2).

Shi et al., "A Tool for Building Decision-Support-oriented Expert Systems," Tools for Artificial Intelligence 90, Nov. 1990, 537–543.

"Beyond's Beyond Mail takes electronic mail where rivals have never trod," Computergram International, Feb. 15, 1991, 1613.

*Primary Examiner*—Robert W. Downs
*Attorney, Agent, or Firm*—Fulbright & Jaworski

[57] ABSTRACT

There is disclosed an expert system using an inference engine which allows for user defined rules. The rules are stored as external data to the engine and provide for forward and backward chaining so that the rules operate through each other. The system includes the use of pseudo variables selectable and changeable by a user.

15 Claims, 6 Drawing Sheets

FIG. 3a

RULE STRUCTURE

RULE <NAME>
IF <CONDITION 1>
    .
    .
    .
   <CONDITION n>
THEN <CONCLUSION 1>
    .
    .
    .
   <CONCLUSION m>
ELSE <COUNTER CONCLUSION #1>
    .
    .
    .
   <COUNTER CONCLUSION P>

FIG. 3b

**LOAN GUIDE
RULE MANAGEMENT**

1. RULE NAME:   CHECK MINIMUM AGE OF APPLICANT         DATE
2. RULE TARGET: BORROWER            3                  UPDATED: 3/24/91
3. IF BORR_AGE < 18
4. THEN PRINT
5. APPLICANT IS UNDER THE MINIMUM AGE – DECLINE LOAN
6. ELSE PRINT
7. <NULL>

FIG. 3c

**LOAN GUIDE
POINT EVALUATION MANAGEMENT**

1) POINT EVALUATION NAME:  EVALUATE YEARS AT PRESENT ADDRESS
2) EVALUATION TARGET: BORROWER
3) EXPRESSION:  BORR_YRS_ADDRESS
4) STANDARD BASE VALUE: 2          5) PERCENT DEVIATION
                                        (+ OR −)
       VALUE #2:  5                     3%
       VALUE #3:  7                     4%
       VALUE #4:  10                    5%
       VALUE #5:  15                    6%

PSEUDOVARIABLES

| | |
|---|---|
| NUM_BORROWERS | HS_HAZARD_INS_NEW |
| NUM_FORMS | HS_RE_TAXES |
| FUNDING_DATE | HS_RE_TAXES_NEW |
| APP_TYPE | HS_MORTGAGE_INS |
| APP_INCOME | HS_MORTGAGE_INS_NEW |
| APP_EXPENSES | HS_ASSOCIATION |
| APP_ASSETS | HS_ASSOCIATION_NEW |
| APP_LIABILITIES | HS_OTHER |
| APP_MAX_BALANCE | HS_OTHER_NEW |
| APP_CASH | HS_UTILITIES |
| APP_LIQUID_ASSETS | HS_UTILITIES_NEW |
| APP_NET_WORTH | HS_TOTAL |
| LOAN_AMOUNT | HS_TOTAL_NEW |
| LOAN_TERM | BORR_LAST |
| LOAN_RATE | BORR_FIRST |
| LOAN_PAYMENT | BORR_SSN |
| LOAN_PURPOSE | BORR_AGE |
| PURCHASE_PRICE | BORR_SCHOOL_YRS |
| OFFICER_LIMIT | BORR_CITY |
| OFFICER_MARGIN | BORR_STATE |
| OFFICER_NAME | BORR_ZIP |
| OFFICER_CLASS | BORR_YRS_ADDRESS |
| PCT_DOWN | BORR_MARITAL |
| MIN_AMOUNT | BORR_NUM_DEPS |
| MAX_AMOUNT | BORR_SELF_EMPLOYED |
| INIT_RATE | BORR_EMPLOYER |
| INIT_TERM | BORR_JOB |
| LOAN_CUTOFF | BORR_YRS_COMPANY |
| PROP_VALUE | BORR_YRS_PROFESSION |
| PROP_COST | BORR_HOME_PHONE |
| PROP_IMPROVEMENTS | BORR_WORK_PHONE |
| PROP_UNITS | BORR_JUDGEMENTS |
| PROP_CITY | BORR_BANKRUPTCY |
| PROP_COUNTY | BORR_FORECLOSED |
| PROP_STATE | BORR_LAWSUIT |
| PROP_ZIP | BORR_ALIMONY |
| FORM_INCOME | BORR_BORROW_DP |
| FORM_EXPENSES | BORR_ENDORSER |
| FORM_ASSETS | BORR_CITIZEN |
| FORM_LIABILITIES | BORR_RESIDENT |
| FORM_MAX_BALANCE | BORR_NONRESIDENT |
| FORM_NET_WORTH | INC_BASE |
| FORM_LIQUID_ASSETS | INC_OVERTIME |
| HS_RENT | INC_BONUSES |
| HS_MORTGAGE | INC_COMMISSIONS |
| HS_MORTGAGE_NEW | INC_DIVIDENDS |
| HS_FINANCING | INC_RENTAL |
| HS_FINANCING_NEW | INC_OTHER |
| HS_HAZARD_INS | INC_TOTAL |

LOAN GUIDE
UTILITIES MANAGEMENT SYSTEM

| SELECT CATEGORY |
| --- |
| REAL ESTATE MORTGAGES |
| CORPORATE BANKING LOANS |
| FHA/VA LOANS |
| CONSUMER LOANS |

FIG. 5b

LOAN GUIDE RULES
ATTACHING RULES TO CATEGORIES

1. CATEGORY NAME: REAL ESTATE MORTGAGES

| RULES |
| --- |
| ✓ CHECK MINIMUM AGE OF APPLICANT |
| ✓ CHECK FOR STABLE EMPLOYMENT |
| ✓ CHECK FOR MINIMUM REQUIRED % DOWN PAYMENT |
| ✓ CHECK MONTHLY DEBT ALLOWANCE AGAINST 36% OF INCOME |
| ✓ CHECK HOUSING PAYMENT AGAINST 28% OF INCOME |
| ✓ CHECK FOR BANKRUPTCY FILINGS |
| ✓ CHECK FOR LAWSUITS PENDING |
|    CHECK TO SEE IF BORROWER IS ENDORSER ON ANY OTHER LOANS |
|    CHECK FOR HEI INDUSTRIES EMPLOYEES * |
| ✓ CHECK FOR SELF EMPLOYMENT OF BORROWER |
|    APPROVE/DISAPPROVE SUBJECT TO VERIFICATION |
|    CHECK FUNDS AVAILABLE FOR DOWN PAYMENT |

FIG. 5c

```
LOAN GUIDE
ATTACHING POINT EVALUATIONS TO CATEGORIES

CATEGORY NAME:  REAL ESTATE MORTGAGES
              ┌──────────────────────────────────────────────────┐
              │              POINT EVALUATIONS                   │
              ├──────────────────────────────────────────────────┤
              │ ✓ EVALUATE YEARS AT PRESENT ADDRESS              │
              │ ✓ EVALUATE YEARS IN PROFESSION                   │
              │ ✓ EVALUATE YEARS WITH PRESENT EMPLOYER           │
              │   EVALUATE FOR BANK EMPLOYEE *                   │
              │ ✓ EVALUATE NET WORTH                             │
              │ ✓ EVALUATE PERCENT DOWN FOR A LOAN               │
              │ ✓ HOUSING EXPENSE – INCOME PERCENTAGE FOR REAL ESTATE LOANS │
              │ ✓ EVALUATE IF CUSTOMER HAS HAD A BANKRUPTCY      │
              │ ✓ EVALUATE CREDITOR LAWSUITS PENDING             │
              │   EVALUATE IF CO-SIGNER ON OTHER LOANS           │
              │   EVALUATE SURPLUS INCOME                        │
              │   EVALUATE LTV FOR OWNER OCCUPANT REAL ESTATE *  │
              └──────────────────────────────────────────────────┘
```

USER ADAPTABLE EXPERT SYSTEM

This is a continuation of application Ser. No. 07/673,955, filed on Mar. 22, 1991, now abandoned.

TECHNICAL FIELD OF THE INVENTION

This invention relates to expert systems and more particularly to such systems which are user definable,

BACKGROUND OF THE INVENTION

An expert system is a program or algorithm which emulates human reasoning. There are several components to an expert system. There is a user interface, a knowledge base, an inference engine and a data base. The user interface tells the user what the state of the expert system is at any particular time. A data base feeds data to the expert system. The knowledge base contains the rules that control the reasoning process. The inference engine itself actually processes the rules inside the knowledge base and actually does the reasoning.

A typical example of an expert system is in the medical field. First there is a diagnosis of a problem based upon the condition or illness of a person and his/her symptoms. Then based upon the symptoms and in response to questions that the knowledge base asks the doctor, the system will reason out a certain illness that a patient may have.

An example of an expert system used in the banking industry would be in traditional loan processing. After an applicant fills out a loan application, the data from the loan application is fed into the knowledge base, and the rules go about discerning his/her credit worthiness.

In existing systems, the knowledge bases themselves have to be "hard coded" such that the rules are static and cannot easily be changed. To be changed, a programmer must actually edit the knowledge base in such a way that the previous knowledge base may or may not be valid anymore. This editing process may introduce errors, but also introduces time constraints resulting in the bank no longer having control of the knowledge base itself. Usually the bank must hire a programmer in order to maintain control of its system.

The way an expert system works is that data is fed through the user interface. A knowledge base contains rules which interpret the data. The knowledge base has all the rules internally such that decisions are made within that knowledge base, and all processing is performed internal to the knowledge base. Therefore, a large number of programming changes are necessary if the knowledge base is to be modified. The programmer must take into consideration what the previous rules are doing, and how those rules are being processed to see what effect any change has on the system. Thus, the degree of complexity in modifying the knowledge base could result in high maintenance costs.

Accordingly, there is a need in the art for an expert system which is easily adaptable to new rules and situations.

There is a further need in the art for an expert system which is easily adaptable to changes in the user's environment, to new rules or to rules having different parameters for different periods of time.

A still further need in the art is for an expert system which is flexibly adapted to a user's changing economic environment and business operations.

SUMMARY OF THE INVENTION

We have solved these problems with a system which provides adapting the rules to be contained outside of the knowledge base such that the knowledge base can process the rules as external data. The rules can then be altered at any time by the user. This concept allows the user to take the rules and focus them or to attach them easily to given situations. The rules can be attached to a process or to a particular object so that the rule can evaluate or can be executed at a particular time. The rules (and attributes) can be turned on or off or assigned (removed) from a given product at any time.

In a banking system an example would be where there are loan products that must be evaluated to certain underwriting rules. This system allows the rules to be attached to specific products. As market conditions or economic conditions change, the system allows for the removal of a rule or the addition of a rule or the change of a rule for that particular product.

An example of changing a rule would be if there were no longer a particular condition that was required for a loan application, such as there was no longer a constraint of age for an applicant. The age limitation could be removed from that product, while for other types of loans, that age rule could still stay in effect. Perhaps, the age rule might need to be only modified as to age rather than removed or attached.

Accordingly, it is a technical advantage of our invention to be able to change knowledge base rules instantaneously and the knowledge base updated such that those new rules are being executed to their updated status.

A further technical advantage of our expert system is that the user can change the rules at any time, or can change the attributes of the rules for any given user product as that programming changes to the underlying structure of the knowledge base.

A still further technical advantage of this system is that a user can add or modify a set of rules and attributes at any time and the knowledge base will process the newly established rules as external data to the knowledge base.

A still further technical advantage of our system is that a set of rules can be established and their parameters set and then a user can add or remove any of the listed rules to any evaluation package processed by the knowledge base.

A still further technical advantage of our system is that both the rules and the parameters to a knowledge base rule set can be selected or changed or created by a user without changes to the knowledge base itself.

BRIEF DESCRIPTION OF THE DRAWINGS

A more complete understanding of the present invention may be acquired by referring to the detailed description and claims when considered in connection with the accompanying drawings in which like reference numbers indicate like features wherein:

FIG. 3A shows the generic rule structure of the present invention;

FIG. 3B shows a specific example of a particular rule;

FIG. 3C shows a specific example of point evaluation management;

FIG. 4 shows some of the pseudovariables used in the present invention;

FIGS. 5A, 5B AND 5C show how rules and point evaluations are attached to objects.

DETAILED DESCRIPTION OF THE INVENTION

Figure 1:
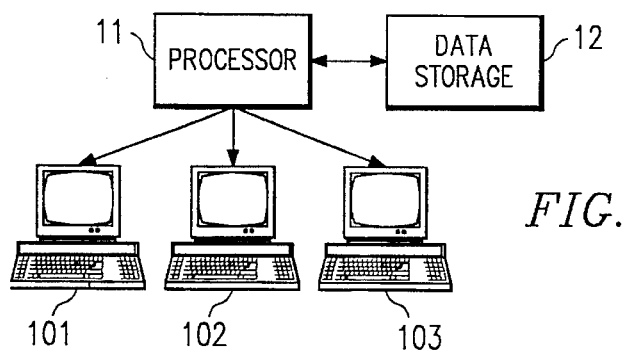
FIG. 1 shows a block diagram of one embodiment of the system of the present invention.

FIG. 1 shows an overview of a system having three terminals 101, 102, 103 controlled by processor 11, which in turn interacts with data storage 12. It should be understood that this a block diagram only, and processor 11 can be included within each terminal 101, 102 or 103 to make standalone terminals, or the terminals can be tied together on a network controlled by a processor central as shown or a processor in one of the terminals. The exact configuration is unimportant, but will in any event interact with data storage 12, which ideally would be central to all terminals 101, 102, 103, but which could in certain applications, be contained within a single terminal.

For purposes of our discussion, a rule will be defined as a structure such that it has a set of hypothesis, that when satisfied they execute a certain set of conclusions, or if they fail, may execute a certain set of counterconclusions. The structure is set up in such a way that when the information for a hypothesis can be gained, a decision is made at that point to either execute the conclusions or execute the counterconclusions of the rule.

Figure 2A:
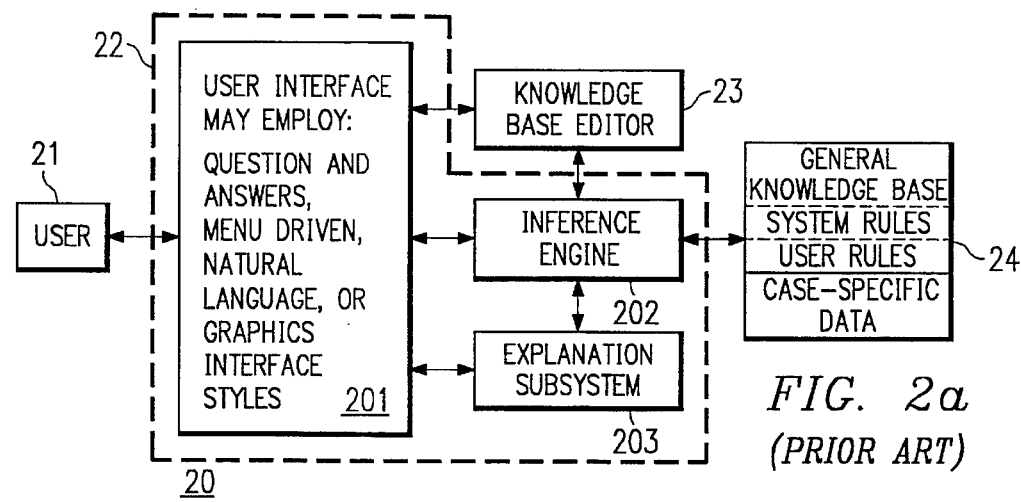
FIG. 2A shows a prior art conventional expert system.

FIG. 2A is the conventional expert system 20 diagram. It shows how general knowledge base 24, which includes system rules and user rules, are put together. This shows that the system rules work with the user rules, and that inference engine 202 interprets both those rules at the same time according to the case specific data.

Figure 2B:
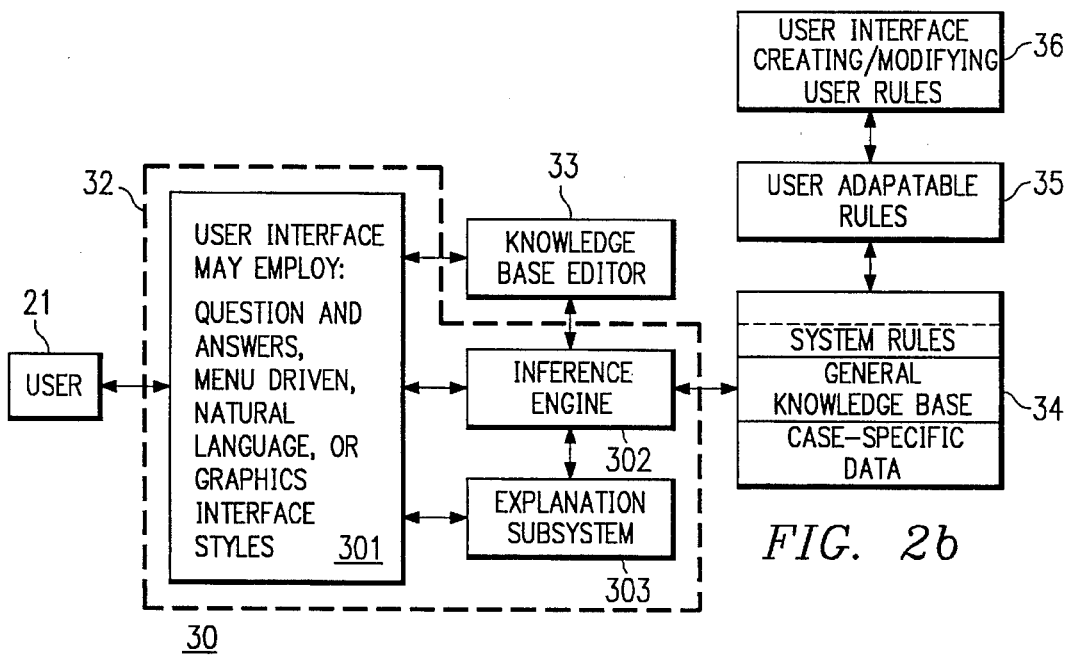
FIG. 2B shows one embodiment of the expert system of the present invention.

FIG. 2B shows one embodiment of our invention. We have taken user rules 35 and separated them and called them user-adaptable rules, such that now when general knowledge base 34 is run, it consults user-adaptable rules 35 just like it would consult case specific data. The rules are input and can be changed at any time. Also, the user-adaptable rules are modified through their own interface 36, such that that interface only has to do with creating and modifying the user rules themselves. This will be discussed in more detail in FIG. 6.

FIG. 3A shows a generic rule structure. We give the rule a name, which is a label for identification. It shows a set of conditions 1–n, which are evaluated to a value of true or false. If the value of true comes out of the evaluations, then the conclusions are executed at that point. The conclusions are here stated 1–m. There may be multiple conclusions. If the conditions of the IF statement are false, then the set of counterconclusions may be evaluated. Again, the counterconclusions may be multiple and are here shown as 1–p.

A specific example of a rule is shown in FIG. 3B where the rule is given a specific name, such as "check minimum age of applicant." Here line 3 shows there is one IF condition. This condition states that the borrower's age is less than 18. When this condition is executed, one of two values will result, either a true value or a false value.

If a true value results, then the THEN portion of this rule will be executed. The THEN portion of the statement is "print applicant is under the minimum age, decline loan." If the IF condition fails (is false), the ELSE statement in this case will print because the counterconclusion (i.e. looking to other factors for a decision) is not known. The rule can be changed in many different ways, i.e., the IF statement itself can be modified, the THEN statement can be modified, or an ELSE statement can be added. It also should be noted that this rule can be used for any number of different loan types and the use or nonuse of a particular rule for a loan type can be under the control of the user as will be seen.

The rule name itself is a label to identify the rule to the user. It actually has no value in the system except to identify this set of hypotheses and conclusions to the users. The rule is targeted to a specific part of the loan application. This was done because of the different levels of the system. In the embodiment there are three levels; the application level, a form level, and a borrower level.

The application level includes all the applicants on the application, and all their figures and values are summed together. It contains information about the application in general. In the embodiment, we can have up to eight borrowers, and in this context, all eight borrowers' figures and incomes are summed such that the sum can be accessed on an application level.

The form level can have up to two borrowers (perhaps husband and wife) such that their numbers or figures may be added together so that the system can determine what the couple's income might be and what their expenses might be.

The system also goes down one more level to what we consider to be a borrower level. At the borrower level, the system can find out exactly what an individual borrower's income is, what his/her expenses might be, employment, and any other personal information. In that way, the system can actually have rules that check a certain borrower's individual age, work, number of years of employment, and income.

To process the rules the system uses an English-like language such that the user can understand what the rules are intended to cover. This is accomplished throughout the system by establishing pseudovariables. The pseudovariables are an English-like label that corresponds to a value in the system. For instance, in this case the rule may be "borr_age." This corresponds to a borrower's age. If there are eight applicants on an application, the rule will actually test each of the borrowers specifically for their age. That is where the target comes in. If the rule itself is targeted for an application, the rule is fired once for that application. If the rule is targeted for the form level, the rule itself is evaluated for each form on the application. If the rule is targeted for a borrower, the rule itself is fired for each borrower within the application. What we have done with our pseudovariables is that we have named them according to the target.

FIG. 4 shows some of the pseudovariables used in the embodiment. The pseudovariable is a label which corresponds to a number within the system. In our case, we actually may do some summing of the individual numbers such that it may apply to one pseudovariable. Some examples of pseudovariables are "app_income." This pertains to the income of all borrowers on the application. If there are eight borrowers on the application, all of their income is summed and stored in the pseudo variable "app_income." That way the user may want to reference all of the borrower's income for an application, and this can be done with this one pseudovariable.

An example of this may be if the user wants to check a certain income level for the application. There then would be a rule that would state "IF app_income" <$30,000. What this rule has one effect of doing is actually summing all of the individual borrower's incomes on that application, up to eight in this case, and checking to see if the sum of the borrower's income is less than $30,000. That will differ from a rule which may have the pseudovariable "form_income" or "income_base" such that those pseudovariables correspond to the form level (couple) and the borrower level, respectively.

Another way to input rules into our system is a different interface called a point evaluation. With a rule it evaluates two binary values—either TRUE or FALSE. With a point evaluation, we have attempted to create different levels that the user can access. When an expression is given for a point evaluation, it can evaluate up to five different values such that a conclusion can be drawn upon.

For example, the user may want to test or score the borrower's income. Note that a different score will result in the differing levels of income that the user (bank) wants to process. For example, if the income is less than $10,000, the user may only draw one conclusion, or give one score. If the income is between $10,000 to $20,000, there may be another conclusion, or another score to give, etc., until there is an application income of greater than $100,000.

FIG. 3C shows an example of a point evaluation. Point evaluations are used to give the loan application a score such that that score shows the credit worthiness of the application according to the user guidelines. Each loan category in our case has assigned several different point evaluations to help determine its criteria guidelines. Each point evaluation has associated with it one guideline that helps deem the application credit worthy or not credit worthy. The score for the loan application itself is based upon the value of 100, with 100 being average, or minimally acceptable for a loan. Scores above 100 are deemed a better credit risk and scores below 100 are deemed worse credit risks according to the guidelines set into the system by the user.

Each individual point evaluation returns a score based upon the standard score of 100, plus or minus a certain percentage. After all point evaluations are performed for the loan application, each individual point evaluation score is summed together and then divided by the number of point evaluations, which gives us an average score of 100, plus or minus a certain percentage. It is from this score that the overall credit worthiness of the application is taken.

Note that there are several subtle differences between rules and point evaluations. First, a rule gives a comment about the loan application itself based upon the IF expression. A point evaluation does not necessarily comment about the loan application in general, but is used in conjunction with other point evaluations to determine a score which values the credit worthiness of the loan application. Also, a rule has only two actions to be taken upon the execution of the IF expression. If the IF expression is true, the THEN expression is executed. If the IF expression is false, the ELSE expression is executed.

For a point evaluation, there can be several conclusions about the expression. In our case we happen to have five conclusions, but that is implementation dependent and can be as few as two, or perhaps as many as 100. With a point evaluation, each different conclusion relates to an overall score which is used in conjunction with other point evaluations to get an overall score of the loan application's credit worthiness.

Turning now to FIG. 3C, line 1) shows the point evaluation name. This is a label for the user so that the user can remember what the point evaluation is. Line 2) is the evaluation target which targets the point evaluation to the part of the application it desires to be tested. Again, there are three target levels. The first is the application level, the second is the form level, and the third is the borrower level. These are the same target types as the rules.

Line 3) is the expression. The expression here can be made up of variables, operators, constants and numeric values. Together they are evaluated or interpreted to return one value. That value is then used against the values to determine the score at the point of evaluation.

In our example of FIG. 3C, the expression is the borrower's years at current address. That expression reviews the number of years at the current address for each borrower on the form. The standard base value is the value from the expression in which the point evaluation will give a score of 100. Values 2 through 5 are values of the above expression in which scores will deviate from the basis score of 100. In this case we have values 2 through 5 being 5, 7, 10 and 15, respectively. If the borrower has been at his/her present address for two years or more, the score will be 100. If the borrower has been at his/her address between 2–5 years, the score will deviate from 100. In this case, if the borrower has been at his/her address for over 2–5 years, a score deviation of +3% will be given, or overall a score of 103 will result. If he/she has been at his/her address for 7 or more years, the score deviation will be +4% and thus this point evaluation will be 104. Ten or over (under 15) returns a value of 105, while 15 or more returns a value of 106.

In this example, all deviations are positive. That, however, is not necessarily the case in all point evaluations. Depending upon the values 2–5, there can be a negative percent deviation to return a score of less than 100.

This system can be used in many different situations. For example,, in the medical world a rule may ask about a cholesterol level of an applicant (patient) according to his/her weight. That is, if an applicant has a weight of greater than 160 and a cholesterol level of greater than 240, then he/she is at risk for a heart attack.

The point evaluation may sum several factors about a heart attack to assess his/her condition. For example, one point evaluation may test the blood pressure level at certain readings. If the reading is lower, the patient will get a lower score. If it is a higher reading, the score will be higher. Another point evaluation may test the cholesterol level such that a lower cholesterol level yields a lower score than does a higher cholesterol level. These are then summed together to hopefully give the patient's condition or risk of a heart attack.

FIG. 5A shows how rules and point evaluations are attached to objects. In the loan guide system, those objects are categories of loans. The first thing we do is allow the user to select a particular category. Based on the selection, all of the rules that are available within the selected category are listed.

FIG. 5B shows the rules for the real estate mortgages category. The user simply moves the cursor to a particular rule and touches the space bar to select the rule thereby attaching the rule to that particular category.

In FIG. 5C, this similar process is used to attach point evaluations, also to a category level.

Again, as business or market situations change, or when the rules within the bank change, the user simply reselects the category and deselects (or adds) the rule or the point evaluation for that particular category. When this occurs, that rule or that evaluation is no longer evaluated (or is evaluated) at the analysis time. Again, if situations change where that rule becomes necessary, the user can simply come back onto the screen and reselect (or deselect) the rule.

In FIGS. 5B and 5C the checkmarks show those rules or point evaluations, respectively, which have been selected for this particular type of loan. Thus, a user can very easily turn on or turn off a particular rule as the business conditions change.

Before discussing FIG. 6, some general characteristics about the inference engine that are needed to make this process viable will be discussed.

The first characteristic of the inference engine is that it must be rule based, i.e. its knowledge base is kept in a form of IF, THEN, ELSE rules. The next characteristic is that the inference engine needs forward and backward chaining so that the rules interact through each other, through forward and backward chaining. The next is that the inference engine must allow access to external data. Whether the data is in a data base or a data file does not matter. This is because the user adaptable rules are treated as external data, and are presented to the system either from a data base or from a data file.

One important characteristic of the inference engine is that its language is actually an interpretative language. This allows the inference engine to have an interpret operator that parses and executes a given string according to the current program state. This feature allows the user adaptable rules to be outside the control knowledge base and they can be changed at any time, whether it is before, after, or during run time. An example of an interpret operator, not necessarily inside an inference engine, is the interpret function in IBM's REXX.

Figure 6:
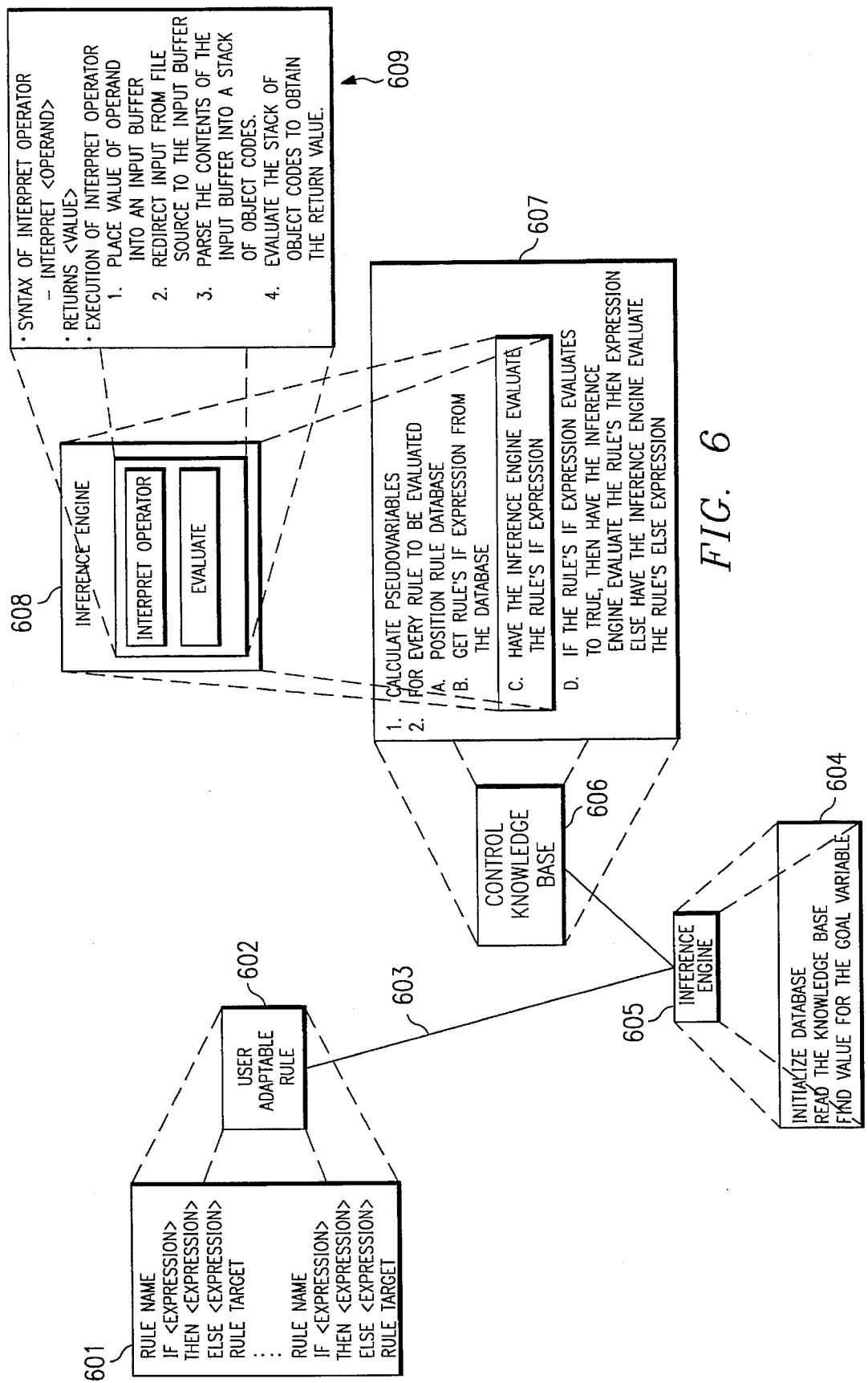
FIG. 6 shows a diagram of the operation of one embodiment of the expert system.

As detailed in FIG. 6, boxes 601 and 602 show the user adaptable rules stored in a data base. There are fields for the rule name, the IF expression, the THEN expression and the ELSE expression and the rule target. These rules can be accessed through data base link 603 into the inference engine. Boxes 604 and 605 show the inference engine. Box 604 shows the initialization steps when the inference engine is first started. The first initialization step is to initialize the data base, to establish a data base link to the user adaptable rule base, and to any data specific to this application. The data base tables are also opened at this time.

The next step is to read control knowledge base 606 which interprets the user adaptable rules. The knowledge base is then checked for syntax errors, and we store the knowledge base in internal format that is easier for the inference engine to understand.

The third step is to find a value for the goal variable. This starts the inference process. It backwards chains to obtain a value for the given goal variable which starts the rule interpretation knowledge base.

Box 607 shows the algorithm for control knowledge base 606. Control knowledge base 606 contains the control rules that are used to interpret the user-adaptable rules. These are the static rules, rules that cannot be changed without recompiling the knowledge base.

Step 1 of the algorithm is to calculate the pseudovariables. Here values are computed for the user and stored into variables with field names that the user will understand. These field names are then used in the user-adaptable rules. An example of this is that the application income may be stored in the variable "app_income" which is equal to the sum of all the borrower income inside the application itself.

Step 2 is for every rule to be evaluated. This means that every rule selected for a given loan category goes through four steps. Step 1(a) The data base is placed at the desired user-adaptable rule. Step 2(b) The rules IF expression is obtained from the data base. Step 3(c) The reference engine evaluates the IF expression. It is here where the interpret operator of the knowledge base language is used to obtain a value for the expression. This is shown in box 608. In Step 4(d), if the value of the IF expression is true, then the THEN expression of the rule is evaluated. If the value of the ELSE expression is true, the ELSE expression of the rule is evaluated.

Box 608 and Box 609 show how the inference engine interpret operator works. Box 608 itself shows the same inference engine as Box 605, but in a different manner. Box 609 shows how the interpret operator works. The interpret operator has a syntax of the interpret key word and then with one operand. The operand can be any string value such that it is syntactically correct.

The execution of the interpret operator is as follows:

Step 1. Place the value of the operand into an input buffer.

Step 2. Redirect the input from a file source to the input buffer.

Step 3. Parse the contents of the input buffer into a stack of object codes desired by the inference engine.

Step 4. Evaluate that stack of object codes just generated to obtain the return value.

In the case of user-adaptable rules, going back to Box 607 Step C, the IF expression is taken and placed into the input buffer of Box 609. The input source is then redirected from the inference engine to the input buffer which now contains the rules IF expression. The contents of the rules IF expression are then parsed into a stack of object codes desired by the inference engine. After that is done, the rules IF expression is executed and returns a value of either TRUE or FALSE.

In summary, FIG. 6 shows how user-adaptable rules can be present inside the system. The user-adaptable rules have the flexibility that they can be changed without recompiling the control knowledge base. User-adaptable rules can be changed at any time during the knowledge base inference engine execution, and can be changed by the end user at any time. They do not require an engineer or computer programmer to change the rules.

Although this description describes the invention with reference to the above specified embodiments, the claims and not this description limit the scope of the invention. Various modifications of the disclosed embodiment, as well as alternative embodiments of the invention, will become apparent to persons skilled in the art upon reference to the above description. Therefore, the appended claims will cover such modifications that fall within the true scope of the invention.

What is claimed is:

1. An expert system for use as a decision support system, said system comprising:

a general knowledge base including a set of system rules;

a first data base of case specific data including industry specific data for arriving at a decision;

an interface for receiving a plurality of externally stored user-defined rules and selectively changing by said user ones of said user-defined rules at any time, wherein said plurality of user-defined rules comprise logical expressions stored as a string of pseudovariables in an interpretive language;

means for specifying, by presenting to said user a table of said plurality of user-defined rules and marking by said user a subset of said plurality of user-defined rules, which of the plurality of user-defined rules to apply for arriving at said decision; and an inference engine cooperatively utilizing a subset of said set of system rules in connection with said subset of said plurality of user-defined rules to process a particular portion of said first data base of case specific data.

2. The system set forth in claim 1 wherein said interface includes means for receiving said user-defined rules as either a data file or a second data base.

3. The system set forth in claim 1 further comprising:

means for selecting a subset of said set of system rules based upon a received user input.

4. The system set forth in claim 1 further comprising:

means for accessing an external third data base by said inference engine.

5. The system set forth in claim 1 further comprising:

an interpret operator for parsing and executing a given string of said pseudovariables according to a program state.

6. The system set forth in claim 1 further including:

means for chaining forward and backward so that said subset of said plurality of user-defined rules and said subset of said set of system rules interact through each other.

7. A method of operating an inference engine of an expert system, the expert system having a general knowledge base with a set of system rules for arriving at evaluations, a first data base of case specific data, an interface, and an inference engine, said method comprising the steps of:

establishing a second data base with a plurality of user-defined rules, the plurality of user-defined rules comprising logical expressions stored as a string of pseudovariables in an interpretive language;

selectively changing, by means of a first user input received through the interface, selected ones of the plurality of user-defined rules;

specifying, by presenting to the user a table of the plurality of user-defined rules and marking by the user selected ones of the plurality of user-defined rules, which of the plurality of user-defined rules to apply for given sets of evaluations; and processing in the inference engine a particular portion of the first data base of case specific data using the specified rules based upon the user input.

8. The method set forth in claim 7 further comprising the step of:

accessing an external data base with said inference engine

9. The method set forth in claim 7 further comprising the step of:

parsing and executing a given pseudovariable string according to a program state using an interpret operator.

10. The method set forth in claim 7 further comprising the step of:

chaining forward and backward so that said plurality of user-defined rules interact through each other.

11. An expert system for evaluating loan applications in a banking environment where loan applicants answer a set of evaluation questions on an application, said system comprising:

a general knowledge base containing a set of system rules;

a first data base of case specific data including banking underwriting criteria;

an interface for receiving a plurality of user-defined rules for evaluating answers to said evaluation questions in accordance with said underwriting criteria and selectively changing by said user ones of said user-defined rules at any time, wherein said plurality of user-defined rules comprise logical expressions stored as a string of pseudovariables in an interpretive language;

means for specifying, by presenting to said user a table of said plurality of user-defined rules and marking by said user a subset of said plurality of user-defined rules, which of the plurality of user-defined rules to apply for given sets of evaluations; and an inference engine cooperatively utilizing a subset of said set of system rules in connection with a subset of said user-defined rules to process a particular portion of said first data base.

12. The system set forth in claim 11 wherein said interface includes means for receiving said user-defined rules as either a data file or a second data base.

13. The system set forth in claim 11 further including:

means for evaluating any evaluation question for a single loan applicant, a pair of applicants or for all the applicants on a particular application, or for applicants on multiple applications.

14. The system set forth in claim 11 further comprising:

means for selecting a subset of said set of system rules based upon a received user input.

15. The system set forth in claim 11 further comprising:

means for storing said user-defined rules in a third external data base.

* * * * *